(12) United States Patent
Oota

(10) Patent No.: US 12,432,458 B2
(45) Date of Patent: Sep. 30, 2025

(54) IMAGING CONTROL DEVICE

(71) Applicant: FANUC CORPORATION, Yamanashi (JP)

(72) Inventor: Yuusuke Oota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 29 days.

(21) Appl. No.: 18/683,971

(22) PCT Filed: Oct. 22, 2021

(86) PCT No.: PCT/JP2021/039090
§ 371 (c)(1),
(2) Date: Feb. 15, 2024

(87) PCT Pub. No.: WO2023/067795
PCT Pub. Date: Apr. 27, 2023

(65) Prior Publication Data
US 2024/0357241 A1    Oct. 24, 2024

(51) Int. Cl.
*H04N 23/72* (2023.01)
*G06V 10/147* (2022.01)
(Continued)

(52) U.S. Cl.
CPC ............. *H04N 23/72* (2023.01); *H04N 23/71* (2023.01); *H04N 23/73* (2023.01); *H04N 23/76* (2023.01);
(Continued)

(58) Field of Classification Search
CPC ........ H04N 23/72; H04N 23/71; H04N 23/73; H04N 23/76; G06V 10/147; G06V 2201/06
See application file for complete search history.

(56) References Cited

U.S. PATENT DOCUMENTS

| 2018/0152619 A1* | 5/2018 | Hoshino | H04N 23/76 |
| 2023/0018060 A1* | 1/2023 | Hejl | H04N 23/56 |
| 2023/0060140 A1* | 3/2023 | Miyajima | H04N 23/71 |

FOREIGN PATENT DOCUMENTS

| JP | H08-289185 A | 11/1996 |
| JP | 2008-113070 A | 5/2008 |

(Continued)

OTHER PUBLICATIONS

International Search Report issued in PCT/JP2021/039090; mailed Dec. 7, 2021.

*Primary Examiner* — Gevell V Selby
(74) *Attorney, Agent, or Firm* — Studebaker Brackett PLLC

(57) ABSTRACT

One form of an imaging control device capable of improving recognition accuracy while ensuring processing speed comprises: an imaging processing unit that uses a camera to acquire an imaged image at an exposure time and gain that were set; an image processing unit that performs image processing on the imaged image and acquires information; a storage unit that stores set values for the exposure time and the gain, a processing time target value for the image processing in the image processing unit, and image processing results; and a setting adjustment unit that adjusts the set values for the exposure time and the gain such that the processing time in the image processing unit becomes at most the target value.

5 Claims, 4 Drawing Sheets

(51) Int. Cl.
*H04N 23/71* (2023.01)
*H04N 23/73* (2023.01)
*H04N 23/76* (2023.01)

(52) U.S. Cl.
CPC ........ *G06V 10/147* (2022.01); *G06V 2201/06* (2022.01)

(56) References Cited

FOREIGN PATENT DOCUMENTS

| | | |
|---|---|---|
| JP | 2012-200025 A | 10/2012 |
| JP | 2016-177481 A | 10/2016 |
| JP | 2020-048225 A | 3/2020 |

\* cited by examiner

IMAGING CONTROL DEVICE

TECHNICAL FIELD

The present invention relates to an imaging control device.

BACKGROUND ART

A system commonly used in workpiece handling systems, for example, captures an image of an object and performs image processing to recognize the position of the object in the captured image. It is known that the object recognition accuracy can be improved by adjusting the exposure time during image capture or by amplifying luminance signals of the captured image. As an example, Patent Document 1 proposes, for example, applying a gain (amplifying luminance signals) in a case where sufficient brightness cannot be obtained even after the shutter speed or the like has been controlled.

CITATION LIST

Patent Document

Patent Document 1: Japanese Unexamined Patent Application, Publication No. 2008-113070

DISCLOSURE OF THE INVENTION

Problems to be Solved by the Invention

Increasing the exposure time leads to an increase in the time it takes to capture an image, and thus an increase in the cycle time of the recognition process, which can result in a decrease in the throughput of the system. Excessively increasing the gain leads to an increase in noise, which can, on the contrary, result in a decrease in recognition accuracy. Therefore, a technology that can improve recognition accuracy while maintaining a sufficient processing speed has been desired.

Means for Solving the Problems

An imaging control device according to an aspect of the present disclosure includes: an imaging processing unit configured to use a camera to acquire an image captured using a set exposure time and a set gain; an image processing unit configured to perform image processing on the captured image to acquire information; a storage unit configured to store setting values for the exposure time and the gain, and a target value of a processing time of the image processing in the image processing unit and results of the image processing; and a setting adjustment unit configured to adjust the setting values for the exposure time and the gain so that the processing time in the image processing unit is equal to or less than the target value.

Effects of the Invention

According to the present disclosure, it is possible to provide an imaging control device that can improve recognition accuracy while ensuring a sufficient processing speed.

PREFERRED MODE FOR CARRYING OUT THE INVENTION

Figure 1:
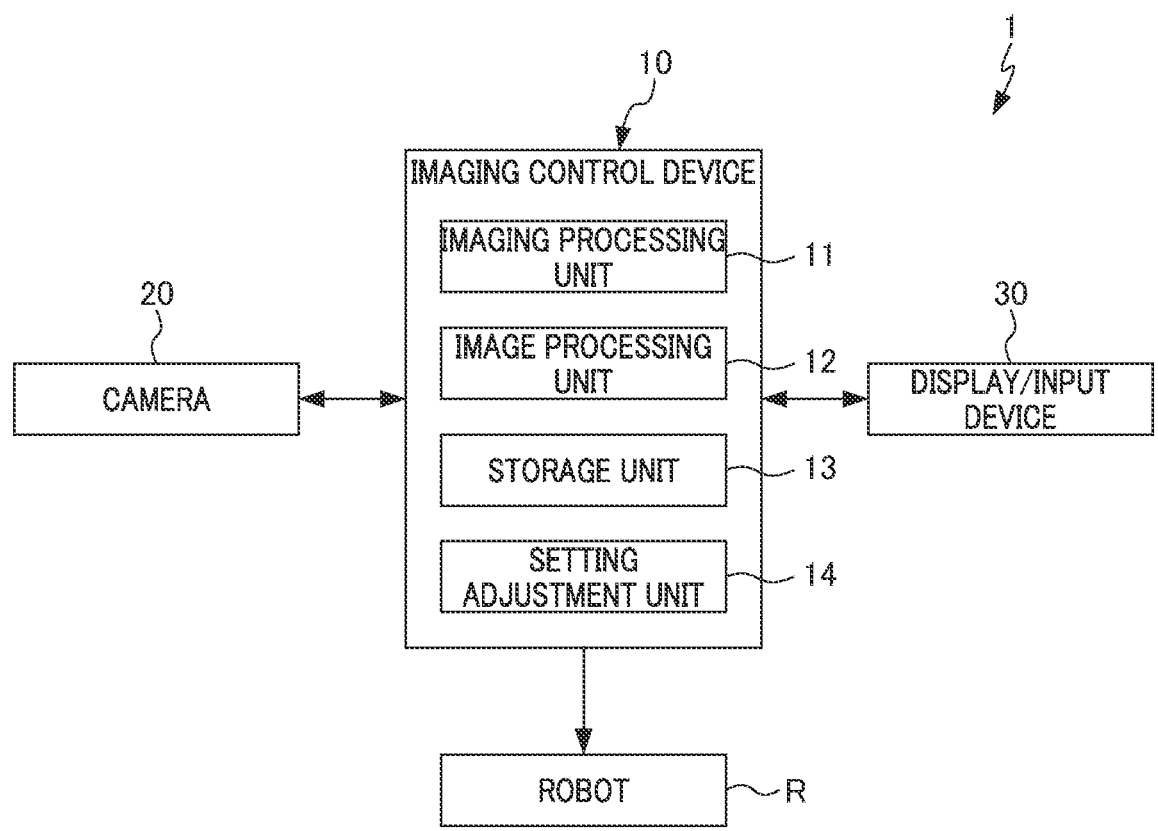
FIG. 1 is a block diagram illustrating a configuration of an object recognition system that includes an imaging control device according to a first embodiment of the present disclosure.

The following describes an embodiment of the present disclosure with reference to the drawings. FIG. 1 is a block diagram illustrating a configuration of an object recognition system 1 that includes an imaging control device 10 according to a first embodiment of the present disclosure.

The object recognition system 1 includes the imaging control device 10, a camera 20 that is controlled by the imaging control device 10 and captures an image of an area where an object can be present, and a display/input device 30 that provides a user interface for the imaging control device 10. The object recognition system 1 recognizes the position of the object, and inputs the position and the orientation of the object relative to a robot R, for example, in order for the robot R to pick up the object.

The imaging control device 10 includes an imaging processing unit 11, an image processing unit 12, a storage unit 13, and a setting adjustment unit 14. The imaging control device 10 can be implemented, for example, by causing a computer device having a processor, memory, an input/output interface, and the like to execute an appropriate control program. The imaging processing unit 11, the image processing unit 12, the storage unit 13, and the setting adjustment unit 14 are distinguishable based on different functions of the imaging control device 10, and do not have to be clearly distinguishable in terms of physical configuration and program configuration.

The camera 20 includes an image sensor that generates a luminance signal for each pixel, and is configured to be controllable through external signals with respect to imaging operation including, for example, adjustment of the exposure time.

The display/input device 30 may be, for example, a device such as a touch panel in which a display device and an input device are integrated. Alternatively, the display/input device 30 may be a combination of a display device such as a display panel and an input device such as a keyboard or a mouse.

The imaging processing unit 11 uses the camera 20 to acquire an image captured using a set exposure time (duration for which the image sensor is exposed to light) and a set gain (amplification factor of luminance signals from the image sensor). Setting values for the exposure time and the gain are stored in the storage unit 13. When the setting values are adjusted, the imaging processing unit 11 acquires an image captured by the camera 20 in accordance with a request from the setting adjustment unit 14. The function to amplify luminance signals with the set gain may be implemented in the camera 20 or in the imaging processing unit 11.

The image processing unit 12 performs image processing on the captured image to acquire information. The present embodiment is based on the assumption that the image processing unit 12 recognizes an object that is present in the captured image and that has a preset shape through a pattern matching process, and acquires information identifying the position and the orientation of the object.

The storage unit 13 stores, in addition to the setting values for the exposure time and the gain, information related to the processing in the imaging control device 10 including setting values such as a target value of the processing time of the image processing in the image processing unit, a feature of a pattern of the object of the image processing, and conditions of the pattern matching process, as well as the results of the image processing. The setting values for the exposure time and the gain can be rewritten by the setting adjustment unit 14. The initial setting values for the exposure time and the gain may be set in a program or entered by a user through the display/input device 30.

As a calibration process, the setting adjustment unit 14 adjusts the setting values for the exposure time and the gain so that the processing time in the image processing unit 12 is equal to or less than the target value. The target value of the processing time may be, for example, entered by the user through the display/input device 30.

The setting adjustment unit 14 may complete the process of correcting the setting values for the exposure time and the gain entirely automatically. Alternatively, the setting adjustment unit 14 may display, on the display/input device 30, information related to the image processing on images captured before and after the adjustment of the setting values for the exposure time and the gain in a manner that facilitates comparison to allow the user to determine whether or not the adjusted setting values for the exposure time and the gain are acceptable.

The setting adjustment unit 14 may be configured to use histograms of the luminance in the captured images, the amount of noise in the captured images, a matching score of the pattern matching derived in the image processing of the captured images, or other values as an indicator for determining the acceptability of the setting values for the exposure time and the gain.

Figure 2:
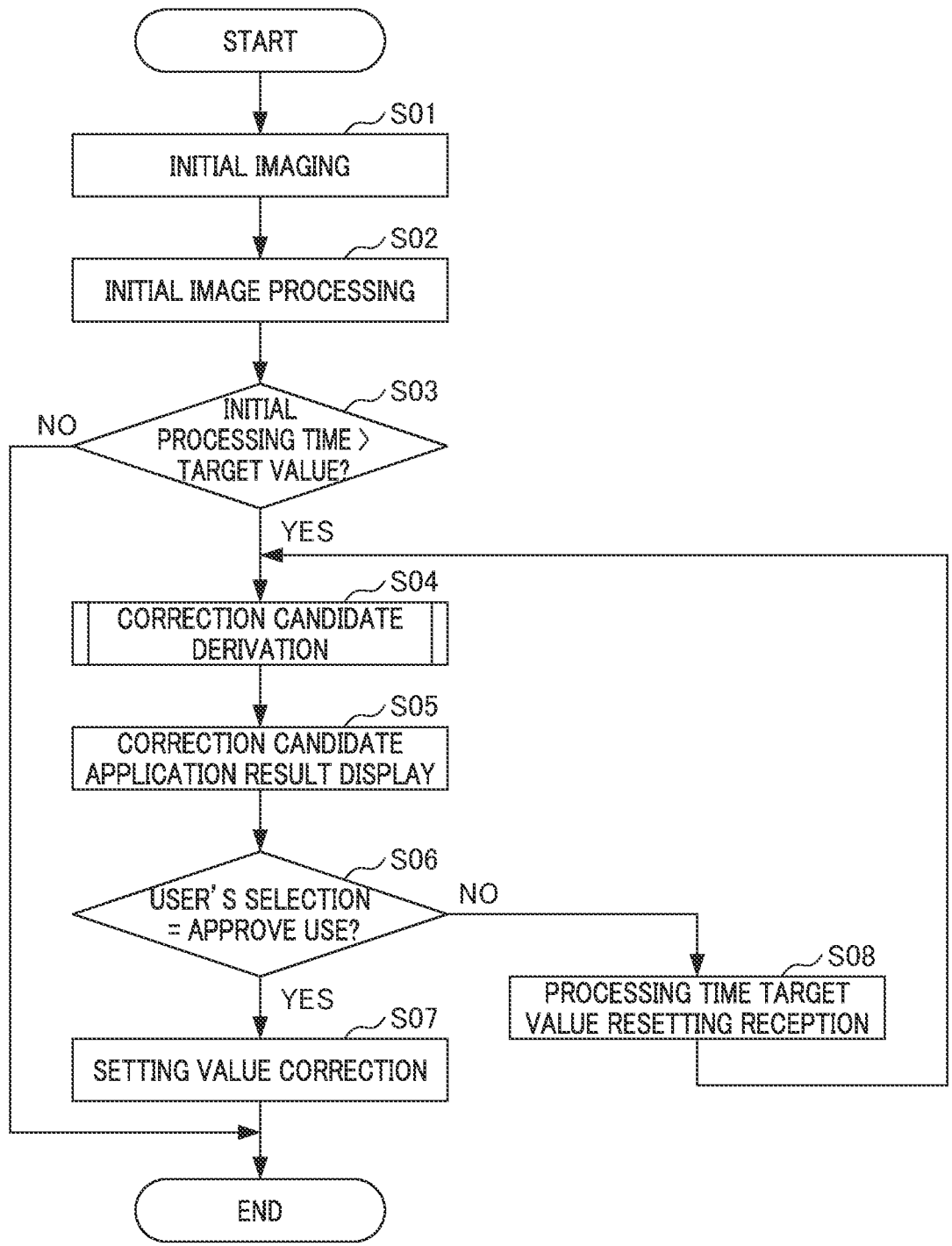
FIG. 2 is a flowchart showing a schematic procedure for setting value adjustment in a setting adjustment unit in FIG. 1.

The following describes a detailed procedure for the setting value adjustment to be performed by the setting adjustment unit 14. FIG. 2 is a flowchart showing a schematic procedure for the setting value adjustment in the setting adjustment unit.

The setting value adjustment process to be performed by the setting adjustment unit 14 may include an initial imaging step (S01), an initial image processing step (S02), an initial processing time checking step (S03), a correction candidate derivation step (S04), a correction candidate application result display step (S05), a user's selection checking step (S06), a setting value correction step (S07), and a processing time target value resetting reception step (S08).

In the initial imaging step at S01, the setting adjustment unit 14 causes the imaging processing unit 11 to acquire an image captured by applying the initial setting values for the exposure time and the gain. The initial setting values may be the most recently used setting values or may be values set as initial values specifically for the purpose of the setting value adjustment. The procedure for the setting value adjustment process may further include a step for receiving initial values from the user.

In the initial image processing step at S02, the setting adjustment unit 14 causes the image processing unit 12 to perform image processing on the captured image acquired in the initial imaging step, and acquires an initial processing time, which is the time required for the image processing.

In the initial processing time checking step at S03, the setting adjustment unit 14 checks whether the processing time acquired in the initial image processing step is greater or less than the target value of the processing time stored in the storage unit 13. If the processing time acquired in the initial image processing step is equal to or less than the target value, the setting values for the exposure time and the gain are determined to be appropriate, and the setting value adjustment process is terminated. If the processing time acquired in the initial image processing step is greater than the target value, the setting value adjustment process continues to S04.

In the correction candidate derivation step at S04, the setting adjustment unit 14 derives correction candidates of the setting values for the exposure time and the gain in accordance with a procedure described below. In the correction candidate derivation step, an image captured using setting values derived as the correction candidates is acquired, and image processing is performed on the acquired image.

In the correction candidate application result display step at S05, the setting adjustment unit 14 displays, on the display/input device 30, the correction candidates of the setting values derived in the correction candidate derivation step, and predetermined items from the image captured and acquired using the correction candidates, and the results of the image processing. Items that are useful for the user to determine the acceptability of the correction candidates of the setting values are selected as the items to be displayed. In the correction candidate application result display step, the setting adjustment unit 14 can also receive the user's input of a determination as to whether or not to use the correction candidates of the setting values. For this purpose, a screen displayed in the correction candidate application result display step may include a button or the like to prompt the user's input.

In the user's selection checking step at S06, the setting adjustment unit 14 checks the user's input to select whether or not to approve the use of the correction candidates of the setting values. If the user approves the use of the correction candidates, the setting value adjustment process continues to S7. If the user does not approve the use of the correction candidates, the setting value adjustment process continues to S8.

In the setting value correction step at S07, the setting adjustment unit 14 rewrites the setting values for the exposure time and the gain stored in the storage unit 13 to the values of the correction candidates.

In the processing time target value resetting reception step at S08, the setting adjustment unit 14 receives resetting of the target value of the processing time by the user. For this purpose, the display/input device 30 preferably displays, for example, a prompt for input of the target value of the processing time, such as a combination of the current target value and a text box for entering a new target value. Once the resetting of the target value of the processing time has been completed, the setting value adjustment process returns to S04, and the correction candidate derivation and the correction candidate acceptability checking described above are repeated.

Figure 3:
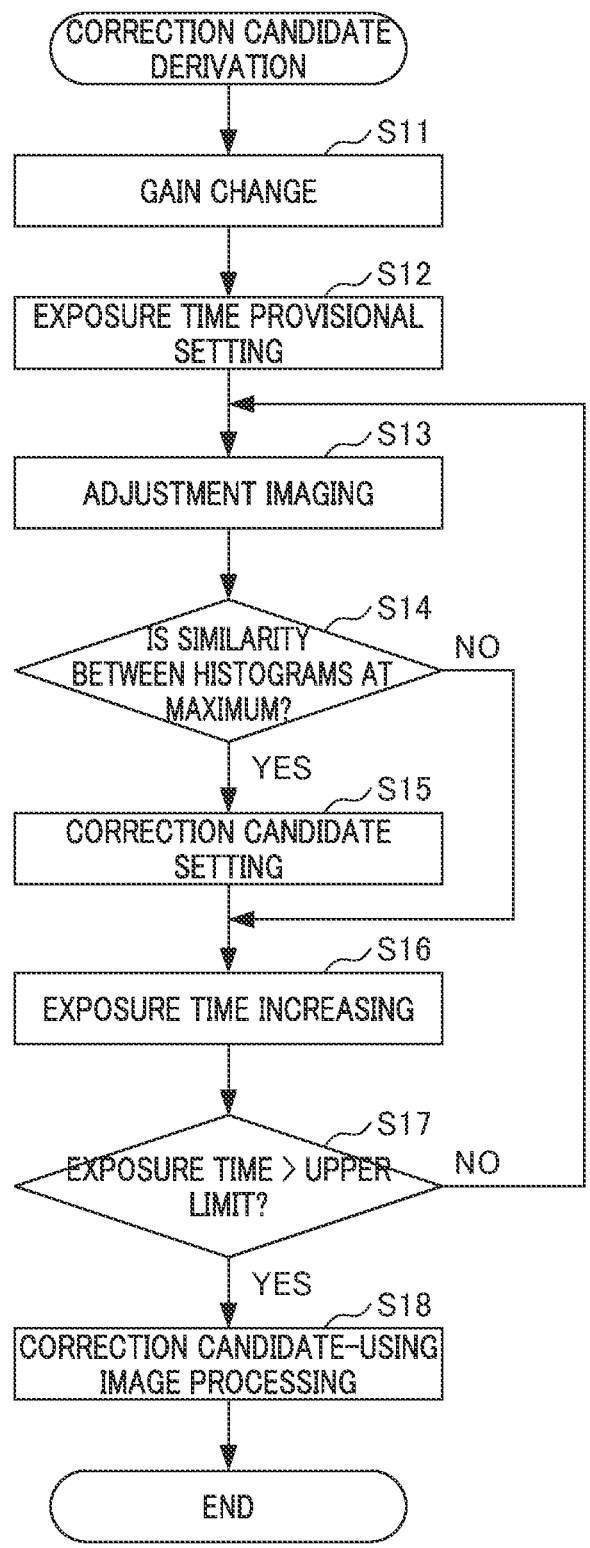
FIG. 3 is a flowchart showing a detailed procedure for a correction candidate derivation step in FIG. 2.

FIG. 3 shows a detailed procedure for the correction candidate derivation process in the correction candidate derivation step at S04 in FIG. 2. The correction candidate derivation process includes a gain change step (S11), an exposure time provisional setting step (S12), an adjustment imaging step (S13), a histogram checking step (S14), a correction candidate setting step (S15), an exposure time increasing step (S16), an exposure time checking step (S17), and a correction candidate-using image processing step (S18).

In the gain change step at S11, the setting adjustment unit 14 sets a correction candidate for the gain based on the initial processing time measured in the initial image processing step in FIG. 2. As a specific example, a correction candidate G2 for the gain can be the minimum settable value that satisfies G2≥(S1/T)×G1, where T is the difference between the initial processing time and the target value of the processing time, S1 is the current setting value for the exposure time, and G1 is the current setting value for the gain.

In the exposure time provisional setting step at S12, the setting adjustment unit 14 initially sets a provisional setting value for the exposure time to be used in a checking process in which correction candidates are derived. The provisional setting value is transiently stored in a working storage area that is different from where the correction candidates are stored. Preferably, the initial provisional value for the exposure time is the minimum settable value for the camera 20.

In the adjustment imaging step at S13, the setting adjustment unit 14 acquires an image captured by applying the provisional setting value for the exposure time and the correction candidate for the gain.

In the histogram checking step at S14, the setting adjustment unit 14 checks the similarity between a histogram of the luminance in the captured image acquired in the adjustment imaging step and a histogram of the luminance in the captured image acquired in the initial imaging step at S01 in FIG. 2. The similarity between the histograms can be, for example, calculated based on one or more indicators, such as the median, the mean, the value at a specific percentile, and the percentage of pixels within a predetermined range. If the similarity of the histogram of the image captured and acquired using the current provisional setting value for the exposure time to that of the captured image acquired in the initial imaging step is at a maximum in the histogram checking step, the correction candidate derivation process continues to S15. Otherwise, the correction candidate derivation process continues to S16.

In the correction candidate setting step at S15, the setting adjustment unit 14 rewrites the value of the correction candidate for the exposure time to the current provisional setting value for the exposure time. Furthermore, in the correction candidate setting step, the image captured and acquired using the current provisional setting value for the exposure time, the histogram thereof, the similarity to the captured image acquired in the initial imaging step, and the like are stored as correction candidate information. In the histogram checking step, therefore, the setting adjustment unit 14 only needs to make a comparison with the value of the similarity of the correction candidate.

In the exposure time increasing step at S16, the setting adjustment unit 14 rewrites the provisional setting value for the exposure time to an increased value. The provisional setting value for the exposure time may be increased by a constant amount or by a constant ratio.

In the exposure time checking at S17, the setting adjustment unit 14 checks whether or not the provisional setting value for the exposure time is exceeded. The upper limit of the exposure time is defined as a value that allows the processing time to be equal to the target value, and may be set as (S1−T).

In the correction candidate-using image processing step at S18, the setting adjustment unit 14 acquires an image captured using the current correction candidate for the exposure time and performs image processing thereon in order to acquire information to be displayed in the correction candidate application result display step at S05 in FIG. 2.

Furthermore, in the correction candidate-using image processing step, the setting adjustment unit 14 may further derive an optimal value for the gain based on the results of the image processing, and correct the correction candidate of the setting value for the gain to the value optimal for the correction candidate for the exposure time.

As described above, the imaging control device 10 includes the setting adjustment unit 14 that adjusts the setting values for the exposure time and the gain so that the processing time in the image processing unit 12 is equal to or less than the target value. More specifically, the setting adjustment unit 14 changes the setting value for the gain first, and then adjusts the setting value for the exposure time so that the similarity between histograms of the luminance in images captured before and after the setting value for the gain is changed is as high as possible. Thus, the imaging control device 10 makes it possible to increase the processing speed while maintaining recognition accuracy without changing settings for the image processing in the image processing unit 12.

Furthermore, the imaging control device 10 can ensure the accuracy of the image processing more reliably, because the setting adjustment unit 14 displays information related to the image processing on images captured before and after the adjustment of the setting values for the exposure time and the gain in a manner that facilitates comparison to allow the user to determine whether or not correction candidates of adjusted setting values for the exposure time and the gain are acceptable. It should be noted that the accuracy of the image processing can be sufficiently ensured even if the processes (S05, S06, and S08) for the above-described user's check are omitted.

Figure 4:
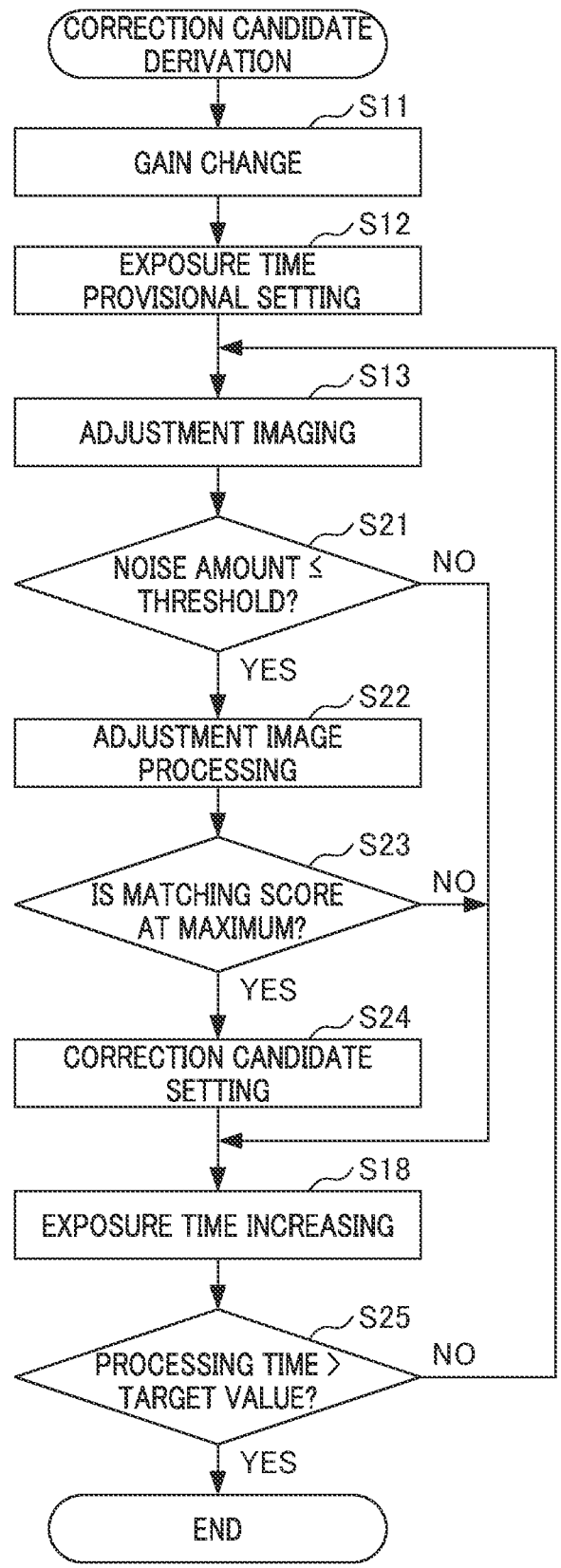
FIG. 4 is a flowchart showing another detailed procedure for the correction candidate derivation step as an alternative to the procedure in FIG. 3.

FIG. 4 shows an alternative procedure for the correction candidate derivation process that can be employed instead of the procedure in FIG. 3. The correction candidate derivation process in FIG. 4 includes the gain change step (S11), the exposure time provisional setting step (S12), the adjustment imaging step (S13), a noise amount checking step (S21), an adjustment image processing step (S22), a matching score checking step (S23), a correction candidate setting step (S24), and an exposure time checking step (S25). It should be noted that the same steps as their corresponding steps in FIG. 3 are denoted by the same reference numerals, and detailed description thereof will be omitted.

In the noise amount checking step at S21, the setting adjustment unit 14 checks the amount of noise in the captured image acquired in the adjustment imaging step. The amount of noise can be calculated based on a change in each pixel value before and after a denoising process on the captured image as, for example, a value such as the number of pixels that have changed or the cumulative value of the amount of change. The denoising process may be performed in accordance with a known algorithm. If the amount of noise is equal to or less than a predetermined threshold, the correction candidate derivation process continues to S22. If the amount of noise is greater than the predetermined threshold, the correction candidate derivation process continues to subsequent S18, skipping S22, S23, and S24.

In the adjustment image processing step at S22, the setting adjustment unit 14 causes the image processing unit 12 to perform image processing on the captured image acquired in the adjustment imaging step, and acquires the value of a matching score calculated for a pattern matching process in addition to the results of the image processing.

In the matching score checking step at S23, the setting adjustment unit 14 checks whether or not the matching score acquired in the adjustment image processing step is at a maximum. Specifically, the setting adjustment unit 14 may check whether the matching score acquired in the adjustment image processing step is greater or less than a matching score acquired using the currently-set correction candidate. If the matching score acquired using the current provisional setting value is at a maximum, the correction candidate derivation process continues to S24. If the matching score acquired using the current provisional setting value is not at a maximum, the correction candidate derivation process continues to S25, skipping S24.

In the correction candidate setting step at S24, the setting adjustment unit 14 rewrites the value of the correction candidate for the exposure time to the current provisional setting value for the exposure time. Furthermore, in the correction candidate setting step, the image captured and acquired using the current provisional setting value for the exposure time, the amount of noise in the captured image, and the like are stored as correction candidate information.

In the exposure time checking step at S25, the setting adjustment unit 14 checks whether or not the processing time of the image processing in the adjustment image processing step is greater than the target value of the processing time.

As described above, the imaging control device 10 that employs the correction candidate derivation process in FIG. 4 changes the setting value for the gain first, and then adjusts the setting value for the exposure time to an extent that the amount of noise in an image to be captured does not exceed the predetermined threshold so that the matching score in the image processing is at a maximum before and after the setting value for the gain is changed. Thus, the imaging control device 10 makes it possible to increase the processing speed while maintaining recognition accuracy.

While an embodiment of the present disclosure has been described above, the present invention is not limited to the foregoing embodiment. The aforementioned effects of the foregoing embodiment are merely a list of the most preferable effects resulting from the present invention. Effects that are produced by the present invention are not limited to the aforementioned effects of the foregoing embodiment.

The imaging control device according to the present disclosure may be adopted in any system that acquires information through image processing of an image captured and acquired using a camera as well as in a system for recognizing an object through pattern matching.

EXPLANATION OF REFERENCE NUMERALS

1: Object recognition system
10: Imaging control device
11: Imaging processing unit
12: Image processing unit
13: Storage unit
14: Setting adjustment unit
20: Camera
30: Display/input device
R: Robot

The invention claimed is:

1. An imaging control device comprising:
   an imaging processing unit configured to use a camera to acquire an image captured using a set exposure time and a set gain;
   an image processing unit configured to perform image processing on the captured image to acquire information;
   a storage unit configured to store setting values for the exposure time and the gain, and a target value of a processing time of the image processing in the image processing unit and results of the image processing; and
   a setting adjustment unit configured to adjust the setting values for the exposure time and the gain so that the processing time in the image processing unit is equal to or less than the target value.

2. The imaging control device according to claim 1, wherein the setting adjustment unit adjusts the setting value for the exposure time so that similarity between histograms of luminance in images captured before and after the setting value for the gain is changed is as high as possible.

3. The imaging control device according to claim 1- or 2, wherein the setting adjustment unit displays information related to the image processing on images captured before and after the adjustment of the setting values for the exposure time and the gain in a manner that facilitates comparison to allow a user to determine whether or not the adjusted setting values for the exposure time and the gain are acceptable.

4. The imaging control device according to claim 1, wherein the setting adjustment unit adjusts the setting value for the gain and the setting value for the exposure time to an extent that an amount of noise in an image to be captured does not exceed a predetermined threshold.

5. The imaging control device according to claim 4, wherein the setting adjustment unit calculates the amount of noise based on a change in each pixel value before and after a denoising process on the captured image.

* * * * *